Patented Dec. 30, 1930

1,786,806

UNITED STATES PATENT OFFICE

SIGURD WESTBERG, OF GERMANTOWN, PENNSYLVANIA

PROCESS OF REFINING IRON AND STEEL

No Drawing.    Application filed October 21, 1924.    Serial No. 745,011.

My invention relates to processes of making iron and steel and particularly to processes of preparing a highly purified ferrous material in the molten condition.

It is among the objects of my invention to prepare any iron or steel substantially free from manganese, carbon, oxygen and non-metallic impurities such as sulphur and phosphorus.

Another object of my invention is to provide a process whereby ferrous material, such as highly purified scrap silicon steel, may be remelted and recast into ingots without introducing impurities that are detrimental to the properties of the metal.

Heretofore, the process of making steel in the open hearth or Bessemer furnace has been carried on in the presence of gases containing oxygen and other impurities in such amounts that it is impossible to eliminate the impurities in the steel beyond certain limits. In such processes, it was impossible to reduce the equilibrium between the impurities in the molten steel and the impurities in the gases and slag to a point such that a highly purified product could be produced.

For example, in refining steel in the open hearth, the molten bath is first treated with an oxide slag in order to reduce the percentage of carbon and phosphorus present to a low value. This operation, by reason of its oxidizing character, introduces oxides and sulphur into the metal. The steel is then treated with a carbide or lime-carbon slag under reducing conditions in order to reduce the oxygen and sulphur content. It is necessary during this part of the process to maintain a strongly reducing atmosphere. The furnace gases contain carbon monoxide along with some oxygen, carbon dioxide and water. The reactions are illustrated by the following equations:

$$CaO + 3C = CaC_2 + CO$$
$$CaC_2 + 3FeO = 3Fe + CaO + 2CO.$$

However, this reaction does not proceed to completion because it is reversible and because it is prevented from doing so by reason of a resulting equilibrium between the CO of the furnace atmosphere, the FeO and the iron itself. The result is that the reduction of the FeO can progress only to a certain determinable point. A further result of this slag and furnace atmosphere equilibrium is that the steel is always recarburized. The same result is also obtained when ferro-manganese or ferro-silicon are used for deoxidizing the metal in the furnace.

A similar equilibrium between the iron sulphide and phosphide in the metal and the slag-furnace-atmosphere phase results in an equilibrium beyond which no more sulphur or phosphorus can be removed from the steel. In all cases, recarburization of the steel results because carbon and carbon monoxide are present in order to prevent reoxidation of the metal.

Manganese, when present, also combines with oxygen and sulphur in the steel and forms a manganese oxide and sulphide slag. In this case, the carbon monoxide reducing atmosphere results in a certain equilibrium at which no more sulphur or oxygen can be extracted from the steel and, also, in recarburization of the steel.

The foregoing method has been satisfactory in the manufacture of the carbon steels but it cannot be utilized where it is necessary to produce an extremely pure steel free from carbon and oxides as well as from sulphur and phosphorus.

Heretofore, the low carbon high grade steel has been made by starting with a highly oxidized bath and reducing the oxides by means of some reducing agent such as aluminum or ferro-silicon. High grade steel, low in impurities may be produced by this process where all the materials used are selected on account of their low content of sulphur and phosphorus. However, the process is limited in its ability to purify the steel beyond a certain point by reason of the necessary conditions of equilibrium between the impurities in the metal and the gas-slag phases. The quality of the steel is also limited by the impurities that always exist in the raw materials, iron ore, lime and fuel. Hence, the reduction of carbon, oxygen, sulphur and phosphorus in the latter process can be carried only to a definite determinable point.

My invention provides means for purifying the steel and for reducing the equilibrium ratio between the impurities in the metal and the gas-slag phase to a low value that is independent of the impurities in the raw materials. My process results in the removal of the impurities in the metal to a degree not hitherto accomplished.

Into a suitably designed furnace, I introduce molten iron that has preferably been oxidized and from which the major portion of the impurities have been removed. For the initial charge, I may use molten steel from an open hearth or Bessemer furnace or I may simply melt a charge of scrap-iron or steel. I prefer to use a charge prepared from scrap steel containing comparatively small amounts of impurities or if Bessemer or open-hearth steel is used, I prefer highly oxidized steel containing an amount of carbon, manganese or silicon approximating .1 of 1%.

The molten iron is introduced into a gas treating furnace, such as a closed electric furnace, in such manner that slag from any previous operation is excluded. Hydrogen or a gas containing hydrogen is continuously introduced over the metal or bubbled into the metal so that all gases containing oxygen are excluded and there is an excess of hydrogen so that the gaseous products of the reactions are continuously removed from the furnace.

The hydrogen dissolves in the molten metal and combines with the impurities therein such as oxygen, sulphur and phosphorus and thereby forms gaseous compounds such as hydrogen sulphide, hydrogen phosphide and water, that are carried away from the molten bath by the excess of hydrogen. The water formed by the union of hydrogen and oxygen reacts with the carbon present in the iron or steel and forms oxides of carbon which are likewise eliminated by the excess of hydrogen gas.

I also utilize a solid phase that serves the purpose of a slag and reacts with the products of the combination of the impurities and hydrogen. In most instances, I prefer to use a strongly basic material, such as lime on account of the cheapness of the material but I may use any of the oxides or silicides of the alkaline earth metals, oxides or silicides of zirconium, manganese or aluminium, or a compound of any of the above named oxides and silicides. I may also add carbon to one of the above-described compositions and bring about the purification without recarburizing the steel. As long as I maintain a reducing atmosphere of hydrogen over the bath, the reactions between hydrogen and the oxygen, carbon, sulphur and phosphorus proceed in the steel bath and continue to remove such impurities therefrom. The continual removal of the gaseous compounds of hydrogen from the steel bath, maintains an unstable equilibrium between the impurities and the hydrogen that always tends to remove the impurities.

The reactions may be illustrated as follows:

$$FeO + H_2 = Fe + H_2O$$
$$Fe_3C + H_2O = 3Fe + CO + H_2.$$

The combination of these two reactions gives the resultant reaction that is brought about in my process, namely, $$FeO + Fe_3C + H_2 = 4Fe + CO + H_2$$

The latter reaction is caused to proceed by removing the carbon monoxide and any excess water if more oxygen is present than carbon from the sphere of chemical activity. If there is an excess of carbon present, the carbon is prevented from recarburizing because of the inhibiting effect of hydrogen as follows:

$$xFe_3C + yH_2 = 3xFe + C_xH_y$$

The sulphides and phosphides act like FeO in the first equation forming hydrogen sulphide and hydrogen phosphide, and the latter compounds in turn react with the solid phase forming, for example, calcium sulphide and phosphide. As long as the gases such as carbon monoxide and water, which in certain concentrations at certain temperatures of molten steel act as oxidizers, are replaced by hydrogen, the purification continues without recarburizing or oxidizing the bath, or oxidizing the sulphur and phosphorus. Therefore, the sulphur and phosphorus are not recombined with the steel.

I may utilize my process in making and in purifying a silicon steel and prevent the destruction of the furnace lining that takes place in the open hearth and electric steel process, for example, by adding calcium silicide to the lime-carbide material, as follows:

$$FeS + H_2 = Fe + H_2S$$
$$FeS + CaO + H_2 = Fe + CaS + H_2O$$
$$2H_2O + Si = SiO_2 + 2H_2$$
$$2FeS + Si + XCaO + H_2 =$$
$$2Fe + 2CaS + (X-2)CaO.SiO_2 + H_2$$

Again in this case, I produce a strongly reducing condition by means of the hydrogen and I also regenerate hydrogen. The hydrogen and the excess of lime act to inhibit the formation of $SiO_2$ that attacks the furnace lining when the open hearth or the electric steel process of making steel is used. Therefore, I may, if desired, remelt silicon steel scrap or add silicon steel scrap to other steel and reclaim and purify it by my process.

Instead of lime, I may utilize any of the oxides of the alkaline earth metals or zirconium oxide or mixtures thereof, and instead of calcium silicide, I may utilize silicides of the aforesaid metals, or silicides of iron, aluminium or manganese.

The compounds of hydrogen and the impurities that are being removed from the steel are, therefore, continuously removed from the zone of chemical activity in the steel-making furnace and the resultant equilibrium always tends to remove the impurities without recarburizing or oxidizing the steel.

Although I have described a specific process and a modification of melting and purifying steel and ferrous alloys I do not wish to be limited thereto as other modifications of my process may be utilized. Instead of treating a bath of unpurified molten iron or steel, I may utilize my process for remelting solid scrap material for producing a product of substantially the same amount or a smaller amount of impurities. Instead of hydrogen gas, I may utilize a mixture of hydrogen and other gases such as a mixture of hydrogen and nitrogen or a mixture of hydrogen and carbon monoxide, but in such proportions that the metal is not recarburized or oxidized or such that no nitrides of the metal are formed. Other modifications of my invention will suggest themselves to those skilled in the art without departing from the spirit of my invention, the scope of which is defined in the annexed claims.

I claim as my invention:

1. A process of refining steel which comprises introducing it into a hearth, adding an excess of gas containing hydrogen, removing impurities of said metals as compounds of hydrogen commingled with an excess of said hydrogenous gas, and regenerating hydrogen by causing said compounds of hydrogen to react with a silicide of an alkaline earth metal.

2. A process of refining steel which comprises introducing steel into a hearth, adding an excess of a hydrogenous gas, removing impurities of said metals as compounds of hydrogen commingled with said hydrogenous gas, and regenerating hydrogen by causing said compounds of hydrogen to react with a compound of an alkaline earth metal and a silicide of ziroconium, aluminium or manganese.

3. A process of refining steel which comprises introducing it into a hearth, adding an excess of a hydrogenous gas, removing impurities of said metals as compounds of hydrogen commingled with said hydrogenous gas, forming a solid compound of said impurity and an akaline earth metal, and regenerating hydrogen by causing said compounds of hydrogen to react with a silicide compound containing zirconium, aluminium, or manganese.

4. A process of refining steel which comprises treating it in a molten condition with a gas capable of forming hydrogenized compounds with impurities in said steel with a solid strongly basic material capable of forming non-gaseous compounds of said impurities and with a silicide compound of a metal capable of maintaining a reducing condition in the bath, causing said hydrogenized compound to react with said solid materials forming solid compounds of said impurities and regenerating hydrogen.

5. The process of refining metal in molten condition which comprises passing a hydrogenous gas into said metal, adding a strongly genous gas into said metal, adding a strongly basic material comprising an oxide compound of a metal, adding a reducing compound of a metal, forming hydrogenized compounds of impurities in said metal, removing a part of said hydrogenized compounds from said metal with an excess of said hydrogenous gas, forming compounds of said impurities with said oxide, forming other compounds with said reducing compound, thereby maintaining an equilibrium that favors the continuous removal of said impurities from said metal by the formation of said compounds of said oxide compound and said reducing compound with some of said impurities and by replacing others of said hydrogenized impurities and gases by an excess of said hydrogenous gas.

6. The process of refining metal in molten condition which comprises passing a hydrogenous gas into said metal, adding a strongly basic material comprising an oxide compound of an alkaline earth metal, adding a silicide compound of a metal, forming hydrogenized compounds of impurities in said metal, removing a part of said compounds from said metal with an excess of said hydrogenized gas, forming compounds with said silicide, thereby maintaining an equilibrium that favors the continuous removal of said impurities by the formation of said compounds of said oxide compound and said reducing compound with some of said impurities and by replacing others of said hydrogenized impurities and gases by an excess of said hydrogenous gas.

7. The process of refining metal in the molten condition which comprises passing a hydrogenous gas into said metal, adding a strongly basic material comprising an oxide of an alkaline earth metal, adding a silicide of a metal and carbon, forming hydrogenized compounds of impurities in said metal, removing a part of said hydrogenized compounds from said metal with an excess of said hydrogenous gas, forming compounds of said impurities with said alkaline earth metal, forming other compounds with said silicides and carbon, thereby maintaining an equilibrium that favors the continuous removal of said impurities by the formation of said solid compounds of said alkaline earth compound, by the formation of compounds with said silicide compound, by the formation of compounds with said carbon and by replacing others of said hydrogenized impurities by an excess of said hydrogenous gas.

8. The process of refining metal which comprises melting said metal in an non-oxidizing atmosphere in the presence of a strongly basic slag comprising an oxide of an alkaline earth metal and a compound of a reducing metal, adding hydrogenous gas, forming gaseous compounds of the impurities in said metal and adding an excess of said hydrogenous gas, thereby inhibiting recarburization and the formation of oxides of metallic and of non-metallic impurity-forming constituents.

9. The process of refining a metal which comprises melting said metal in a non-oxidizing atmosphere in the presence of a strongly basic material comprising an oxide of an alkaline earth metal and a silicide of a reducing metal, adding hydrogenous gas, forming gaseous compounds of the impurities of said metal and adding an excess of said hydrogenous gas, thereby inhibiting recarburization and the formation of oxides of metallic and of non-metallic impurity-forming constituents.

10. The process of refining a metal which comprises melting said metal in a non-oxidizing atmosphere in the presence of a strongly basic material comprising an oxide of an alkaline earth metal and a carbide compound of a metal, adding hydrogenous gas, forming gaseous and non-gaseous compounds of the impurities of said metal and adding an excess of said hydrogenous gas, thereby inhibiting recarburization and the formation of oxides of metallic and non-metallic impurity-forming constituents.

11. The process of refining a metal which comprises melting said metal in a non-oxidizing atmosphere in the presence of a strongly basic material comprising an oxide of an alkaline earth metal and a carbide compound of an alkaline earth metal and carbon, adding hydrogenous gas, forming gaseous and non-gaseous compounds of the impurities of said metal and adding an excess of said hydrogenous gas, thereby inhibiting recarburization and the formation of oxides of metallic and of non-metallic impurity-forming constituents.

12. The process of refining ferrous metal which comprises introducing it into a furnace in a molten condition, adding basic materials capable of forming a strongly basic slag comprising an alkaline earth metal mixed with a reducing compound of a metal, forming hydrogenous compounds with impurities in said metal, said mixture being capable of reacting with said hydrogenized compounds of the impurities of said metal and regenerating hydrogen.

13. The process of refining steel which comprises melting it in a furnace, adding a mixture of basic materials capable of forming a basic reducing slag comprising an alkaline earth oxide and an alkaline silicide, forming hydrogenous compounds with impurities in said metal in the presence of the basic slag, said mixture being capable of reacting with said hydrogenized compounds of the impurities of said metal and regenerating hydrogen.

14. The process of refining metal in the molten condition which comprises passing hydrogen into said metal, adding a strongly basic material comprising an oxide compound of a metal, forming hydrogenized compounds of impurities in said metal, removing said compounds with an excess of said hydrogen and maintaining an equilibrium in favor of the continuous removal of said impurities by forming compounds of said oxide metal with some of said impurities and by replacing others of said hydrogenized impurities by an excess of said hydrogen gas.

15. The process of refining metal in the molten condition which comprises passing a hydrogenous gas into said metal, adding a strongly basic material comprising an oxide compound of a metal, forming hydrogenized compounds of impurities in said metal, removing said compounds of impurities in said metal, removing said compounds with an excess of said hydrogenous gas and maintaining an equilibrium in favor of the continuous removal of said impurities by forming compounds of said oxide metal with some of said impurities and by replacing others of said hydrogenized impurities by an excess of said hydrogenous gas.

16. The process of refining ferrous metal which comprises introducing it into a furnace, adding material capable of forming a strongly basic slag which is also capable of reacting with hydrogen compounds of some of the impurities of the metal, passing a hydrogenous gas into said metal in the presence of the basic slag, thereby forming gaseous compounds of the impurities in the metal which react with the basic material and liberate hydrogen.

17. The process of refining ferrous metal containing a small amount of phosphorus and sulphur which comprises introducing it into a furnace, adding a material capable of forming a strongly basic slag which is also capable of reacting with hydrogen compounds of phosphorus and sulphur, passing a hydrogenous gas through the metal in the presence of the basic slag, thereby removing the phosphorus and sulphur as hydrogen compounds, and causing said hydrogen compounds to react with the basic slag to liberate hydrogen.

18. The process of refining ferrous metal which comprises introducing it into a furnace, adding a material capable of forming a strongly basic slag which is also capable of reacting with hydrogen compounds of some of the impurities of the metal, passing a hydrogenous gas into said metal in the presence of the basic slag, thereby forming gaseous compounds of the impurities in the metal, a part of which reacts with the basic material to liberate hydrogen and the remainder being removed by an excess of hydrogen.

In testimony whereof, I have hereunto subscribed my name this 17th day of October, 1924.

SIGURD WESTBERG.